US006991819B2

(12) United States Patent
Pannevis et al.

(10) Patent No.: US 6,991,819 B2
(45) Date of Patent: Jan. 31, 2006

(54) FOOD PRODUCT CONTAINING INSTABLE ADDITIVES

(75) Inventors: Marinus Pannevis, Verden (DE); Botho Stein Von Kamiensky, Verden-Walle (DE); Olivier Capet, St. Pryve St. Mesmin (FR); Siegfried Schmidt, Verden-eitze (DE)

(73) Assignee: Mars, Inc., McLean, VA (US)

(*) Notice: Subject to any disclaimer, the term of this patent is extended or adjusted under 35 U.S.C. 154(b) by 66 days.

(21) Appl. No.: 10/297,828

(22) PCT Filed: Jun. 13, 2001

(86) PCT No.: PCT/EP01/06715

§ 371 (c)(1),
(2), (4) Date: Jun. 18, 2003

(87) PCT Pub. No.: WO01/95745

PCT Pub. Date: Dec. 20, 2001

(65) Prior Publication Data

US 2004/0043113 A1 Mar. 4, 2004

(30) Foreign Application Priority Data

Jun. 13, 2000 (DE) ................................ 100 29 079

(51) Int. Cl.
*A23P 1/12* (2006.01)
*A23P 1/08* (2006.01)

(52) U.S. Cl. ....................................... 426/282; 426/281

(58) Field of Classification Search ................ 426/282, 426/281, 302, 306, 307, 312, 319
See application file for complete search history.

(56) References Cited

U.S. PATENT DOCUMENTS

| | | | | |
|---|---|---|---|---|
| 4,018,908 | A | 4/1977 | Gross | |
| 4,460,610 | A | 7/1984 | Macfie, Jr. | |
| 4,971,820 | A | 11/1990 | Likuski et al. | |
| 5,716,655 | A * | 2/1998 | Hamstra et al. | 426/63 |
| 6,136,353 | A | 10/2000 | Munz | |
| 6,146,681 | A * | 11/2000 | Kuwano et al. | 426/549 |
| 6,440,477 | B2 * | 8/2002 | Nishioka et al. | 426/438 |
| 6,517,903 | B1 * | 2/2003 | Schmidt | 427/294 |
| 6,589,328 | B1 * | 7/2003 | Nussinovitch | 106/205.1 |

FOREIGN PATENT DOCUMENTS

| | | |
|---|---|---|
| WO | WO 93/14645 A1 | 8/1993 |
| WO | WO 98/03080 A1 | 1/1998 |

* cited by examiner

*Primary Examiner*—Keith Hendricks
(74) *Attorney, Agent, or Firm*—Fulbright & Jaworski LLP; Jan K. Simpson

(57) ABSTRACT

A food product containing instable additives, having a food compound consisting of a porous matrix which is provided with a substrate containing instable additives, obtainable by a process in which, in a first step, the matrix is exposed to a partial vacuum; in a second step, the substrate containing instable additives is applied, in a flowable form, to the matrix under the partial vacuum; and in a third step, the pressure is increased, so that the substrate is forced into the pores of the porous matrix and substantially fills them out.

32 Claims, 3 Drawing Sheets

FOOD PRODUCT CONTAINING INSTABLE ADDITIVES

Figure 1:
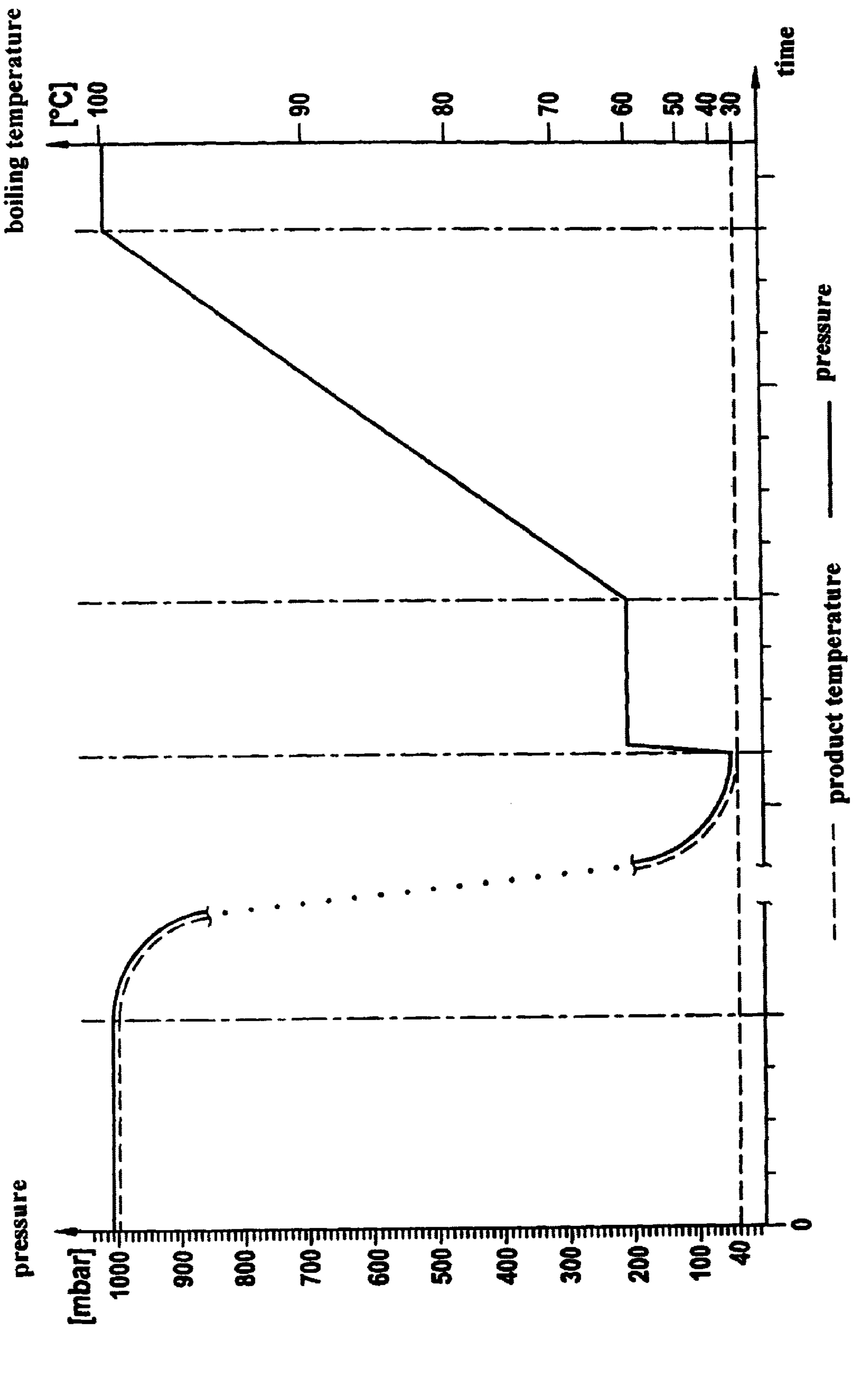

The invention relates to a food product containing instable additives, having a food compound consisting of a porous matrix provided with a substrate containing instable additives.

U.S. Pat. No. 5,968,569 discloses a food product which contains probiotic microorganisms, in which either a substrate containing probiotic microorganisms is sprayed onto a matrix or alternatively a cavity within the matrix is filled with the substrate.

The problem of the invention consists in providing a food product obtained by a method by which it is possible to achieve an improved metering and more even distribution of the substrate containing instable additives on the matrix, and by which improved encapsulation and a longer active life of the probiotic microorganisms within the food product is ensured.

This problem is solved, in accordance with the present invention by a food product containing instable additives, having a food compound consisting of a porous matrix which is provided with a substrate containing instable additives, obtainable by a process in which, in a first step, the matrix is exposed to a partial vacuum; in a second step, the substrate containing instable additives is applied, in a flowable form, to the matrix under the partial vacuum; and in a third step, the pressure is increased, so that the substrate is forced into the pores of the porous matrix and substantially fills them out.

The substrate can contain probiotic microorganisms.

The substrate can contain bioactive substances, in particular enzymes.

Preferably, the substrate contains curcumin.

The substrate can contain perna canaliculus (New Zealand Green-Lipped Mussle) or extracts therefrom.

Furthermore, the substrate can contain L-glutamine, vitamins and/or flavourings.

Preferably, the substrate contains pharmaceutical agents.

The substrate can contain substances that are sensitive to water and/or air.

Preferably, the matrix is an extrudate.

The matrix can be an extrudate and may contain corn and/or rice, for example.

The substrate can contain fat, oil or some other liquid.

Preferably, the food product has an air-tight encapsulation made of a coating material, wherein the coating material can contain fat, it can contain flavourings and can consist at least partially of chocolate.

More preferably, it is envisaged that any pores or pore regions not filled with substrate are at least partially filled with an inert gas, especially nitrogen or carbon dioxide.

The substrate can contain Bacillus lichniformis and/or Bacillus subtilis and/or Lactobacillus acidophilus La5.

The partial vacuum can be between 40 mbar and 990 mbar, especially 200 mbar.

It can be provided for the pressure to which the matrix is exposed in the first step to be reduced within a transition period, beginning at atmospheric pressure, down to the partial vacuum.

In addition, it can be provided for the pressure to be increased, in the third step, to above atmospheric pressure.

Preferably, it is provided for the pressure to be increased by means of an inert gas, especially nitrogen or carbon dioxide.

At the beginning of the first step, the matrix can be at a temperature which is in the region of or below the boiling temperature of water corresponding to the partial vacuum.

As a further embodiment of the invention, it can be provided for the matrix to be extruded and for the first step to be carried out immediately after that, so that the matrix is further expanded and is dried and simultaneously cooled within the first step.

It can be provided for the matrix, at the beginning of the first step to be at a temperature of more than 90° C.

In addition, it can be provided for the matrix to be predried before the first step.

If the matrix is predried within the first step, it can be provided for the partial vacuum to be maintained until the matrix has reached a temperature of 30° C. or less.

During the first step, additional energy, especially in the form of infrared or microwave radiation, can be applied.

Figure 2:
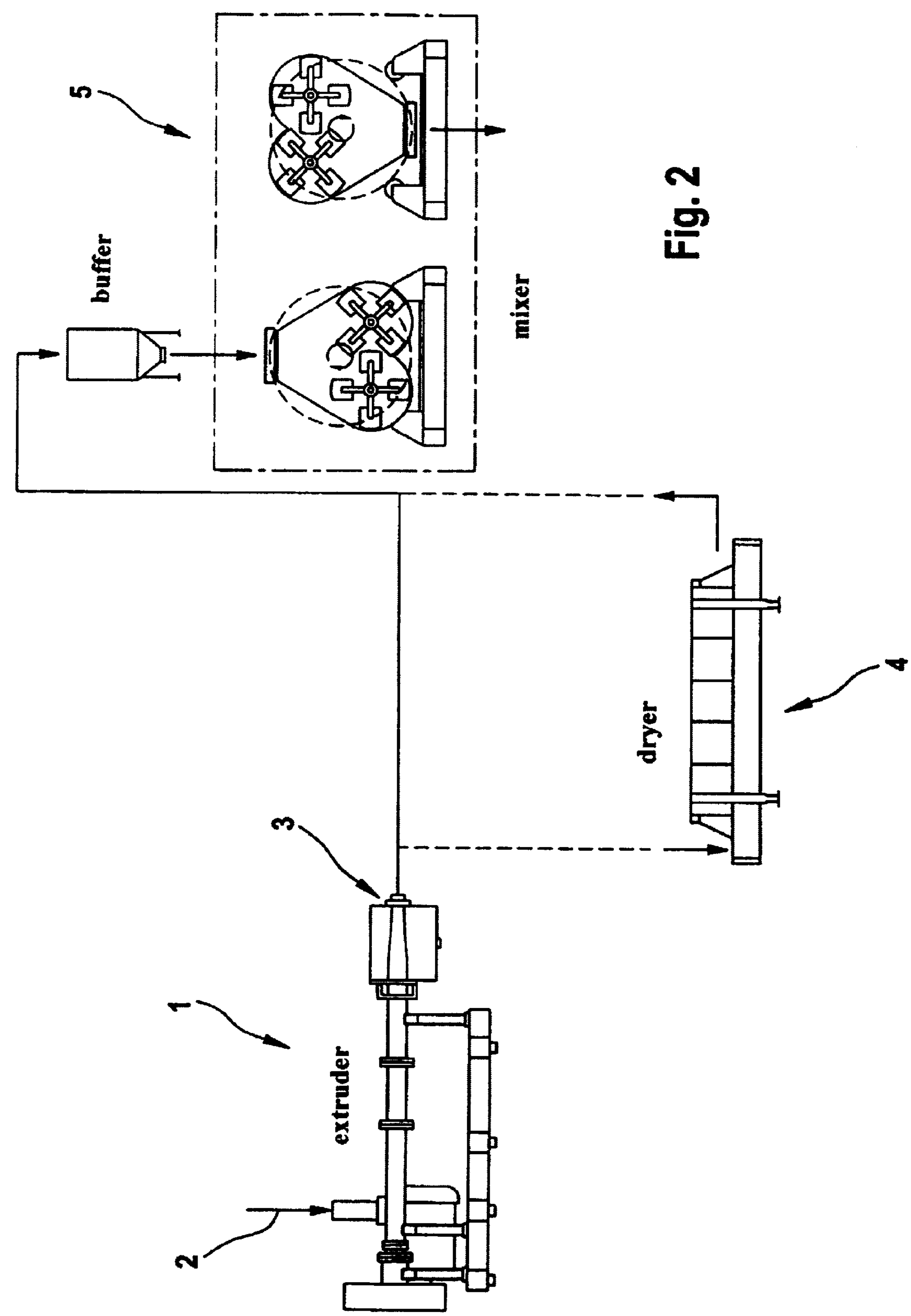
Figure 3:
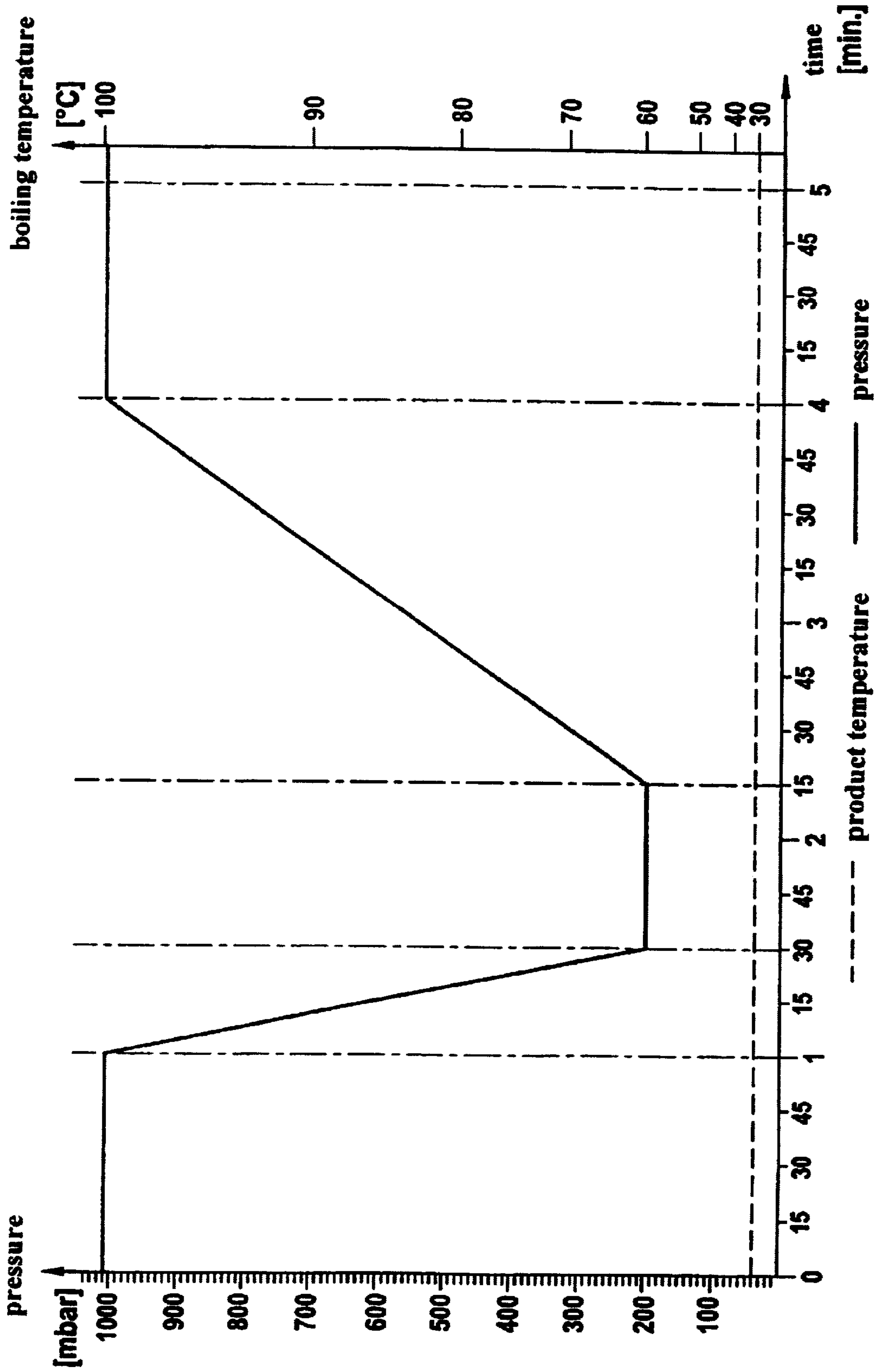

Further advantages and features of the invention can be seen from the following description of preferred embodiments, reference being made to drawings in which FIG. 1 shows an example of the development, over time, of the product temperature and pressure during the preparation of the food product of the invention, FIG. 2 shows an example of a configuration for carrying out the process explained in FIG. 1, and FIG. 3 is a similar presentation to FIG. 1, showing the development, over time, of the product temperature and pressure in an alternative process for preparing the food product.

In order to explain the preparation process, reference is first made to FIGS. 2 and 3. A mixture to be extruded, consisting of different food ingredients, enters the extruder 1 (arrow 2) and emerges from it at the exit orifice 3 at a temperature of approx. 100° C. The extruded product, which forms the porous matrix or basic matrix for the substrate to be applied later, is dried in a drier 4 and subsequently provided with a substrate in a mixer 5.

FIG. 3 serves to explain the time sequence of the processes in the course of vacuum coating inside the mixer 5. Extruded, dried, porous matrix material cooled to approx. 30° C. is introduced at ambient pressure in the form of individual food compounds ("kibbles") into the mixer 5 with its charging door facing upwards (left-hand drawing in FIG. 2). The opening of the hopper is closed, and the internal pressure is reduced, within a relatively short time, e.g. about 1.5 minutes, to a predetermined partial vacuum. The level of this partial vacuum ought to be as low as possible, e.g. down to 40 mbar or also 200 mbar, and is orientated not only towards the general technical conditions, but also towards the kind of probiotic microorganisms contained in the substrate to be introduced and how sensitive they are to reduced pressure, so that, as far as possible, no harm is done to the microorganisms.

Before, after or simultaneously with the introduction of the matrix, the substrate is introduced into the mixer, e.g. by spraying, and the matrix is mixed with said substrate. Ideally, as even as possible a layer forms in the process, consisting of flowable substrate on the outer surface of the individual food compounds in the matrix.

Following this, the pressure in the mixer is raised back to ambient pressure (or briefly even higher), in the course of which the coating material is forced deep into the porous cavities of the extruded matrix. In order to insulate the probiotic microorganisms as far as possible and to shield them from atmospheric oxygen and other influences, this pressure increase can be achieved by means of an inert gas, e.g. nitrogen or carbon dioxide, which penetrates into the pores and fills out the pores or pore regions not filled with substrate. As an alternative, the complete method performed in the mixer can be carried out closed off from air, e.g. in an atmosphere of protecting gas, so that the substrate does not come into contact with air at any time.

Throughout the entire procedure, the product temperature remains virtually unchanged at approx. 30° C., which corresponds to the temperature at which the matrix is introduced. In order to enhance the flowability and the penetration effect, the substrate can be at a slightly higher temperature, e.g. 50° C.

Alternatively it is possible to arrange the process in accordance with FIG. 1. Here, the extruded porous matrix, which exits from the extruder 1 at approx. 100° C., is initially not cooled, and is introduced into the mixer 5 at approx. 95° C. At this point, it should also be pointed out that, in FIGS. 1 and 3, the boiling point of water is plotted on the right-hand side which corresponds in each case to the pressure shown on the left. 200 mbar thus corresponds to a boiling point of approx. 60° C., 40 mbar to approx. 30° C. etc.

After the mixer is closed, the pressure is reduced to approx. 200 mbar or even further, e.g. to 40 mbar (FIG. 1), so that, because of the reduction in the boiling point and the accompanying evaporation of part of the water contained in the extruded material, this can lead to a (further) swelling and considerable cooling and drying. After the pressure of the desired partial vacuum of, for example, 40 mbar or 200 mbar has been achieved and, where appropriate, maintained at that level for a certain time, the desired cooling and drying has occurred, e.g. after cooling to 30° C. (boiling point at 40 mbar).

After this, the substrate containing microorganisms is applied to the food compound present in the mixer.

In other respects, the approach corresponds to the process described in connection with FIG. 3. Since, when vacuum drying of this kind is effected simultaneously with or immediately prior to application to the substrate, only minor local fluctuations in the moisture content occur, this leads to a very accurate adjustment to the moisture, so that the average moisture content compared to hot-air drying can be raised by approx. 1% by weight. This results in considerable energy savings.

Irrespective of the process arrangement selected, the food compounds are subsequently coated with a coating material.

The benefits obtained with the invention consist firstly in the fact that the probiotic microorganisms are sealed in the pores of a porous matrix and are shielded from environmental influences (atmospheric oxygen etc.). In this way, the active life of the microorganisms is substantially longer than when they are applied to the surface.

Furthermore, the achievable metering accuracy compared to conventional techniques is considerably better, so that a food product can be loaded far more evenly with probiotic microorganisms.

A further advantage of the invention is that both during the preparation of and while handling the finished products, there is a substantially reduced likelihood that probiotic microorganisms are unintentionally transferred, since the microorganisms are essentially located inside the product, in the pores of the matrix.

The invention creates the possibility of enhancing not only animal feed, but also snack products for human consumption, such as corn or rice products, with probiotic microorganisms, whose positive effects on health are known.

What is claimed is:

1. A food product containing instable additives, formed by a process comprising the steps of:

providing a food compound consisting of a porous matrix, wherein the matrix is an extrudate;

exposing the matrix to a partial vacuum;

applying to the matrix under the partial vacuum, a substrate containing instable additives, the substrate being in a flowable form;

increasing the pressure, whereby the substrate is forced into the pores of the porous matrix and substantially fills them out, any pores or pore regions not filled with substrate are at least partially filled with an inert gas, therein forming a food product containing instable additives.

2. A food product as claimed in claim 1, whereby the substrate contains probiotic micro-organisms.

3. A food product according to claim 1, whereby the substrate contains bioactive substances.

4. A food product according to claim 1, wherein the substrate contains curcumin.

5. A food product according to claim 1, wherein the substrate contains perna canaliculus or extracts therefrom.

6. A food product according to claim 1, wherein the substrate contains L-glutamine.

7. A food product according to claim 1, wherein the substrate contains vitamins and/or flavourings.

8. A food product according to claim 1, whereby the substrate contains pharmaceutical agents.

9. A food product according to claim 1, whereby the substrate contains substances that are sensitive to water and/or air.

10. A food product as claimed in claim 1, whereby the matrix contains corn and/or rice.

11. A food product as claimed in claim 1, whereby the substrate contains fat.

12. A food product as claimed in claim 1, wherein the food product has an air-tight encapsulation made of a coating material.

13. A food product as claimed in claim 12, wherein the coating material contains fat.

14. A food product as claimed in claim 12, wherein the coating material contains flavourings.

15. A food product as claimed in claim 12, wherein the coating material comprises chocolate.

16. A food product as claimed in claim 1, wherein the substrate contains Bacillus lichniformis, Bacillus subtilis, or Lactobacillus acidophilus La5.

17. A food product as claimed in claim 1, wherein the partial vacuum is between 40 mbar and 990 mbar.

18. A food product as claimed in claim 1, further including the steps of:

prior to exposing the matrix to a partial vacuum; introducing the matrix into a mixer at an ambient pressure; and reducing the pressure within a transition period, beginning at atmospheric pressure, down to the partial vacuum.

19. A food product as claimed in claim 1, further including the step of increasing the pressure to above atmospheric pressure after the pressure has been reduced down to the partial vacuum.

20. A food product as claimed in claim 1, wherein the pressure is increased by means of an inert gas.

21. A food product as claimed in claim 1, wherein prior to exposing the matrix to the partial vacuum, the matrix is at a temperature in the region of or below the boiling temperature of water corresponding to the partial vacuum.

22. A food product as claimed in claim 1, wherein prior to exposing the matrix to the partial vacuum, the matrix is extruded so that the matrix is further expanded and is dried and simultaneously cooled while being exposed to the partial vacuum.

23. A food product as claimed in claim 1, wherein the temperature of the matrix when exposed to a partial vacuum is at a temperature of more than 90° C.

24. A food product as claimed in claim 1, wherein prior to exposing the matrix to the partial vacuum, the matrix is predried.

25. A food product as claimed in claim 1, wherein the matrix is maintained at the partial vacuum until the matrix has reached a temperature of 30° C. or less.

26. A food product as claimed in claim 1, wherein additional energy, especially in the form of infrared or microwave radiation, is applied to the matrix while it is being exposed to the partial vacuum.

27. A food product as claimed in claim 3, wherein the bioactive substances include enzymes.

28. A food product as claimed in claim 1, wherein the inert gas includes nitrogen or carbon dioxide.

29. A food product as claimed in claim 17, wherein the partial vacuum is 200 mbar.

30. A food product as claimed in claim 20, wherein the inert gas includes nitrogen or carbon dioxide.

31. A food product as claimed in claim 1, whereby the substrate contains oil.

32. A food product as claimed in claim 1, whereby the substrate contains a liquid.

* * * * *